United States Patent
Oswald et al.

(10) Patent No.: US 12,473,000 B2
(45) Date of Patent: Nov. 18, 2025

(54) VEHICLE CONTROL SYSTEMS AND METHODS

(71) Applicant: Transportation IP Holdings, LLC, Norwalk, CT (US)

(72) Inventors: James A Oswald, Cedar Rapids, IA (US); Jeffrey D. Chapman, St. Augustine, FL (US); Jeffrey D. Kernwein, Cedar Rapids, IA (US); Jared Little, Fort Worth, TX (US); Vinaykanth V. Mudiam, West Melbourne, FL (US)

(73) Assignee: Transportation IP Holdings, LLC, Norwalk, CT (US)

( * ) Notice: Subject to any disclaimer, the term of this patent is extended or adjusted under 35 U.S.C. 154(b) by 87 days.

(21) Appl. No.: 18/589,793

(22) Filed: Feb. 28, 2024

(65) Prior Publication Data

US 2025/0269885 A1    Aug. 28, 2025

(51) Int. Cl.
*B61L 23/14*    (2006.01)
*B61L 3/16*    (2006.01)
*B61L 27/04*    (2006.01)

(52) U.S. Cl.
CPC ............. *B61L 23/14* (2013.01); *B61L 3/16* (2013.01); *B61L 27/04* (2013.01)

(58) Field of Classification Search
CPC ............ B61L 23/14; B61L 3/16; B61L 27/04
USPC ................................................ 701/116–123
See application file for complete search history.

(56) References Cited

U.S. PATENT DOCUMENTS

| | | | |
|---|---|---|---|
| 2012/0029799 A1* | 2/2012 | Miller | G08G 1/08 701/117 |
| 2012/0065762 A1* | 3/2012 | Pillarisetti | G06Q 99/00 705/500 |
| 2014/0309982 A1* | 10/2014 | Ricci | B60R 25/102 704/3 |
| 2021/0140771 A1* | 5/2021 | Igarashi | G06Q 30/02 |
| 2021/0146973 A1* | 5/2021 | Kuchar | B61L 15/0018 |
| 2021/0389157 A1* | 12/2021 | Igarashi | G08G 1/0141 |

* cited by examiner

*Primary Examiner* — Logan M Kraft
*Assistant Examiner* — Johnny H Hoang
(74) *Attorney, Agent, or Firm* — K&L Gates LLP

(57) ABSTRACT

A vehicle control system and method includes identifying a type of route equipment disposed onboard a vehicle, and identifying one or more locations of a first classification of a pathway from among plural different classifications of pathways along a route. One or more first control settings for controlling operating of the vehicle at the one or more locations of the first classification of the pathway are determined based at least in part on the type of route equipment that is disposed onboard the vehicle and the first classification of the pathway. Operation of the vehicle is controlled according to the one or more first control settings to move the vehicle along the route at the one or more locations of the first classification of the pathway.

20 Claims, 4 Drawing Sheets

VEHICLE CONTROL SYSTEMS AND METHODS

BACKGROUND

Technical Field

The subject matter described herein relates to systems and methods that control operation of powered systems, such as vehicles or vehicle systems (formed from single or multiple vehicles).

Discussion of Art

Vehicles may be equipped with one or more different types of route equipment that allow the vehicles to traverse different classifications of pathways. The different classifications of pathways may include different gauges of tracks for a rail vehicle, different types of road surface (e.g., paved or unpaved), or the like. Additionally, although some vehicles may be equipped with two or more types of route equipment, or a single type of route equipment that is compatible to move along two different classifications of pathways, the manner in which the vehicles are to be operated may vary. For example, a vehicle may include a type of route equipment that is compatible to move along a first gauge of track and a second gauge of track. However, the vehicle may be required to move at a slower speed which traversing the portion of the route that includes the first gauge relative to being allowed to move at a faster speed while traversing the portion of the route that includes the second gauge of track.

In certain instances, a vehicle in transit may come across a portion of a classification of a pathway with which the route equipment onboard the vehicle is incompatible, thereby causing the vehicle to have to stop, change pathways, return to a previous location, or the like, which can disrupt travel of other vehicle systems moving in the area or along the same route. Additionally, having to change pathways and/or return to a previous location may extend a length of a trip for the vehicle, thereby causing the vehicle to arrive late to a destination.

It may be desirable to have a vehicle control system and method that differs from those that are currently available.

BRIEF DESCRIPTION

In accordance with one example or aspect, a method includes identifying a type of route equipment disposed onboard a vehicle, and identifying one or more locations of a first classification of a pathway from among plural different classifications of pathways along a route. One or more first control settings for controlling operating of the vehicle at the one or more locations of the first classification of the pathway may be determined based at least in part on the type of route equipment that is disposed onboard the vehicle and the first classification of the pathway. Operation of the vehicle may be controlled according to the one or more first control settings to move the vehicle along the route at the one or more locations of the first classification of the pathway.

In accordance with another example or aspect, a system includes a controller including one or more processors configured to identify a type of route equipment that is disposed onboard a vehicle. The controller can identify one or more locations of a first classification of a pathway from among plural different classifications of pathways along a route. The controller can determine one or more first control settings for controlling operation of the vehicle at the one or more locations of the first classification of the pathway based at least in part on the type of route equipment that is disposed onboard the vehicle and the first classification of the pathway. The controller can control operation of the vehicle according to the one or more first control settings to move the vehicle along the route at the one or more locations of the first classification of the pathway.

In accordance with another example or aspect, a method includes identifying a first type of route equipment that is disposed onboard a first vehicle of a multi-vehicle system, and identifying a second type of route equipment that is disposed onboard a second vehicle of the multi-vehicle system. A first speed threshold for controlling operation of the first vehicle at one or more locations of a first classification of a pathway may be determined based at least in part on the first type of route equipment that is disposed onboard the first vehicle. The first classification of the pathway is based on a gauge of track at the one or more locations of the first classification of the pathway along a route. A second speed threshold for controlling operation of the second vehicle at the one or more locations of the first classification of the pathway may be determined based at least in part on the second type of route equipment that is disposed onboard the second vehicle. A determination may be made that the first speed threshold is less than the second speed threshold based on a comparison between the first and second speed thresholds. Operation of the multi-vehicle system may be controlled according to the first speed threshold to move along the route at the one or more locations of the first classification of the pathway responsive to determining that the first speed threshold is less than the second speed threshold.

BRIEF DESCRIPTION OF THE DRAWINGS

The subject matter may be understood from reading the following description of non-limiting embodiments, with reference to the attached drawings, wherein below.

DETAILED DESCRIPTION

Figure 1:
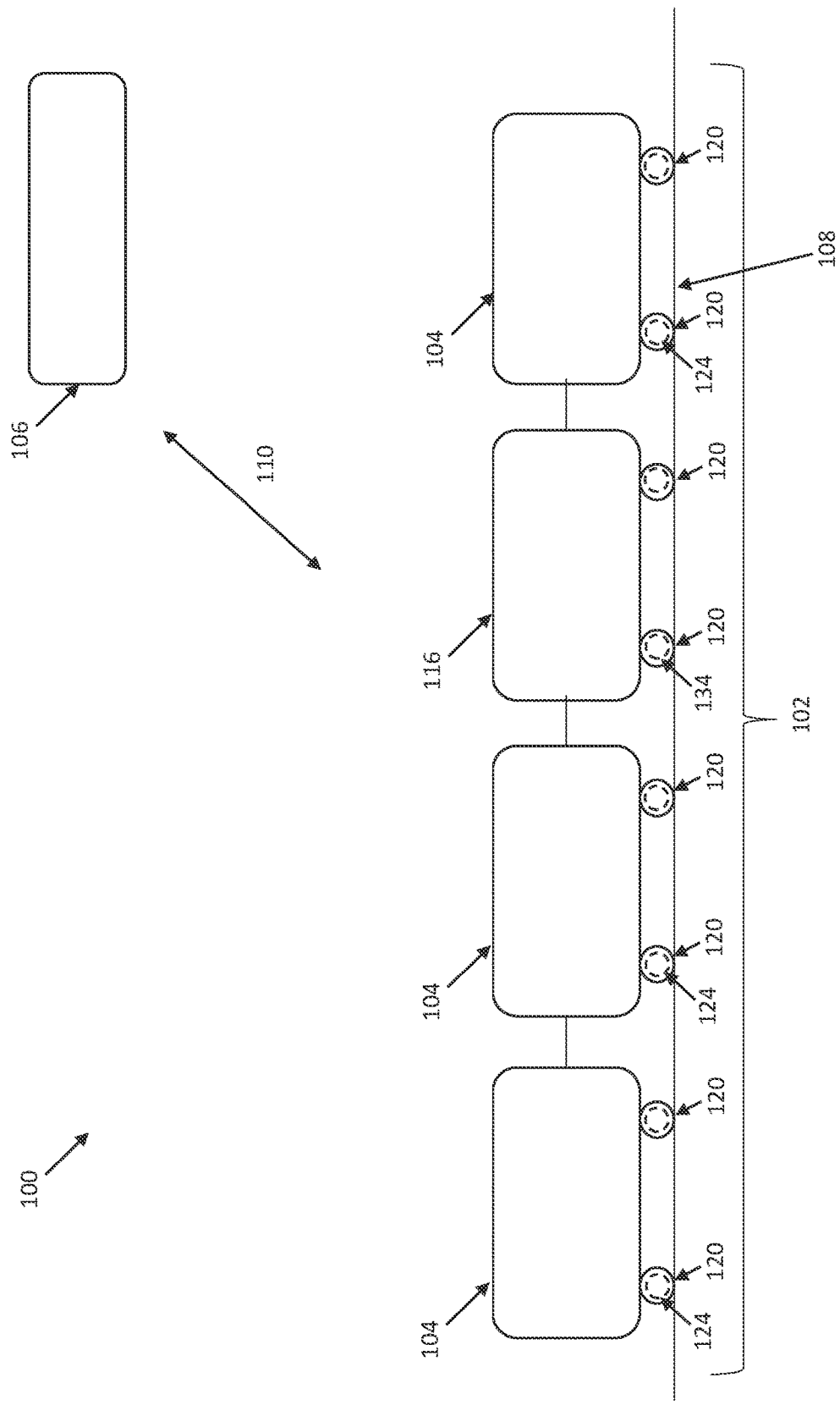
FIG. 1 illustrates a schematic of a vehicle control system, in accordance with one embodiment.

Embodiments of the subject matter described herein relate to a system (e.g., a vehicle control system) and method for controlling operation of a vehicle system. Information associated with the vehicle system may be obtained and/or identified, such as the one or more types of route equipment that is disposed onboard the vehicle system. For example, the one or more types of route equipment that the vehicle system has and/or uses may dictate routes along which the vehicle system is allowed to move, routes along which the vehicle system is prohibited to move, operating conditions of the vehicle system to move along one or more different classifications of pathways along the route, or the like. For example, the vehicle system may be equipped and/or include a first type of route equipment that is compatible with one or more different classifications of pathways of the route (e.g., one or more different gauges of a track, ones or more types of road surfaces, or the like). Additionally or alternatively, the first type of route equipment may be incompatible with one or more of the different classifications of pathways. For example, the vehicle system may be unable to or prohibited from traveling along routes having a classification of pathway with which the first type of route equipment is incompatible. Optionally, the first type of route equipment may be compatible with two different classifications of pathways, and may be required to operate at a first operating setting (e.g., a first speed) while moving along the route at locations having a first classification of pathway, but may be required to operate at a different, second operating setting (e.g., a second speed that is less than or slower than the first speed) while moving along the route at locations having a second classification of pathway.

In one or more embodiments, a trip plan for the vehicle system may be determined, established, and/or modified before the vehicle system embarks on a trip, while the vehicle system is moving along the route, or the like. The trip plan may be based at least in part on the one or more types of route equipment that is disposed onboard the vehicle system, the one or more different classifications of pathways along the route that the vehicle system is expected to travel, or the like. The trip plan may designate operational settings of the vehicle system as a function of one or more of time, location, or distance along the route for the trip. For example, traveling according to the operational settings designated by the trip plan may reduce energy or fuel consumed and/or emissions generated by the vehicle system relative to the vehicle system traveling according to other operational settings that are not designated by the trip plan. For example, the trip plan may optimize travel of the vehicle system.

While one or more embodiments are described in connection with a rail vehicle system, not all embodiments are limited to rail vehicle systems. Unless expressly disclaimed or stated otherwise, the subject matter described herein extends to other types of vehicle systems, such as automobiles, trucks (with or without trailers), buses, marine vessels, aircraft, mining vehicles, agricultural vehicles, or other off-highway vehicles. The vehicle systems described herein (rail vehicle systems or other vehicle systems that do not travel on rails or tracks) may be formed from a single vehicle or multiple vehicles. With respect to multi-vehicle systems, the vehicles may be mechanically coupled with each other (e.g., by couplers) or logically coupled but not mechanically coupled. For example, vehicles may be logically but not mechanically coupled when the separate vehicles communicate with each other to coordinate movements of the vehicles with each other so that the vehicles travel together (e.g., as a convoy).

FIG. 1 illustrates a vehicle control system 100 in accordance with one embodiment. The vehicle control system may include various devices and systems that operate to control operation of a vehicle system 102. The vehicle system can include one or more powered systems, such as vehicles 104, 116, that may travel together along a route 108. In the illustrated embodiment of FIG. 1, the vehicle system is a multi-vehicle system and includes four vehicles that are mechanically coupled together. The vehicles may be propulsion-generating vehicles (e.g., locomotives) or non-propulsion generating vehicles (e.g., rail cars). In alternative embodiments, the vehicle system may include less than four or more than four vehicles, and the vehicles may be mechanically coupled and/or mechanically separated but logically coupled with each other in any combination. In one or more embodiments, the vehicle system may include any number of propulsion-generating vehicles and any number of non-propulsion-generating vehicles.

The vehicle control system can include an off-board control system 106 that may be communicatively coupled with the vehicle system. In one or more embodiments, the off-board control system may include a controller (not shown) that represents hardware circuitry connected with and/or including one or more processors that perform the operations described herein in connection with the control system. The off-board control system may represent a dispatch facility, such as a back-office server, a data center, or the like. The off-board control system may include a communication system (not shown) that allows direct and/or indirect communication 110 between the vehicle system and the off-board control system. The off-board control system may communicate directly with one or more vehicles of the vehicle system, with each propulsion-generating vehicle of the vehicle system, with a lead vehicle of the vehicle system (that may then relay communicated messages between the non-lead vehicles of the vehicle system and the off-board control system), or any combination therein.

In the illustrated embodiment of FIG. 1, the multi-vehicle system 102 includes three first vehicles 104 and a second vehicle 116. In alternative embodiments, the vehicle system may include any number of the first vehicles, any number of the second vehicles, one or more third vehicles (not shown), or the like. Additionally, the first and second vehicles may have an alternative arrangement relative to each other vehicle of the multi-vehicle system. The vehicle system 102 shown in FIG. 1 is for illustrative purposes only and may have any alternative arrangement, makeup of vehicles, or any combination therein.

In one or more embodiments, the first and second vehicles may be equipped with and/or include a type of route equipment. For example, the type of route equipment may allow or permit the vehicles to move along different routes (e.g., routes that support the type of route equipment of the vehicles), may prohibit the vehicles to move along different routes (e.g., routes that are not supported by the type of route requirement of the vehicles), that dictates how the vehicles are to operate while moving along different routes (e.g., speed limits, weight limits, or the like), or the like.

In the illustrated embodiment of FIG. 1, each of the first and second vehicles includes wheels 120. The wheels 120 of the first vehicles 104 may be equipped with and/or include a first type of route equipment 124, and the wheels 120 of the second vehicle 116 may be equipment with and/or include a second type of route equipment 134. The first and second vehicles may only be permitted or allowed to move along portions of routes that are compatible with the first and second types of route equipment that are disposed onboard the different vehicles. Additionally or alternatively, the first and second vehicles may be allowed or permitted to move along portions of routes but at one or more determined control settings. For example, the type(s) of route equipment disposed onboard the first and/or second vehicles may dictate control settings for operating the multi-vehicle system to move along different portions of the route.

In one or more embodiments, the first type of route equipment of the first vehicles may be different than the second type of route equipment of the second vehicle. For example, the first type of route equipment may be compatible with a first route, but the second type of route equipment may not be compatible with the first route. Optionally, the first type of route equipment may be compatible with a first route and a second route, but the second type of route equipment may only be compatible with the first route and may not be compatible with the second route. Optionally, both the first and second types of route equipment may be compatible with a first route, but the first type of route equipment of the first vehicles may require that the multi-vehicle system travels at a first speed that is less than or slower than a second speed that is required of the second vehicle based on the second type of route equipment of the second vehicle. For example, the type(s) of route equipment disposed onboard a vehicle governs, dictates, or controls where the vehicle can travel and/or how the vehicle can travel.

In one or more embodiments, the first and/or second vehicles may have or be equipped with two or more different types of route equipment. The two different types of route equipment may be interchanged, switched, or the like, based on the routes along which the vehicles are expected to move. For example, the first vehicle may be equipped with a first type of route equipment that is suitable or compatible with a track or rail, and the first vehicle may be equipped with a second type of route equipment that is suitable for a non-rail surface (e.g., a road). The first vehicle may be able to switch between using the first type of route equipment or the second type of route equipment based on the type of route along which the first vehicle is expected to travel. Optionally, one type of route equipment may be compatible with a road or other surface, and another type of route equipment may be compatible with a waterway, an airway, or the like.

In one or more embodiments, one of the types of route equipment may be adjustable such that when the route equipment is in a first setting, arrangement, position, or the like, the route equipment is compatible with a first route but not a second route, or alternatively when the route equipment is in a second setting, arrangement, position, or the like, the route equipment is compatible with the second route but not the first route; or is compatible with both the first and second routes, or the like. For example, the route equipment in the first setting may be able to traverse a track that has a first gauge, and the route equipment in the second setting may be able to traverse a track that has a second gauge that is wider or narrower than the first width.

Figure 2:
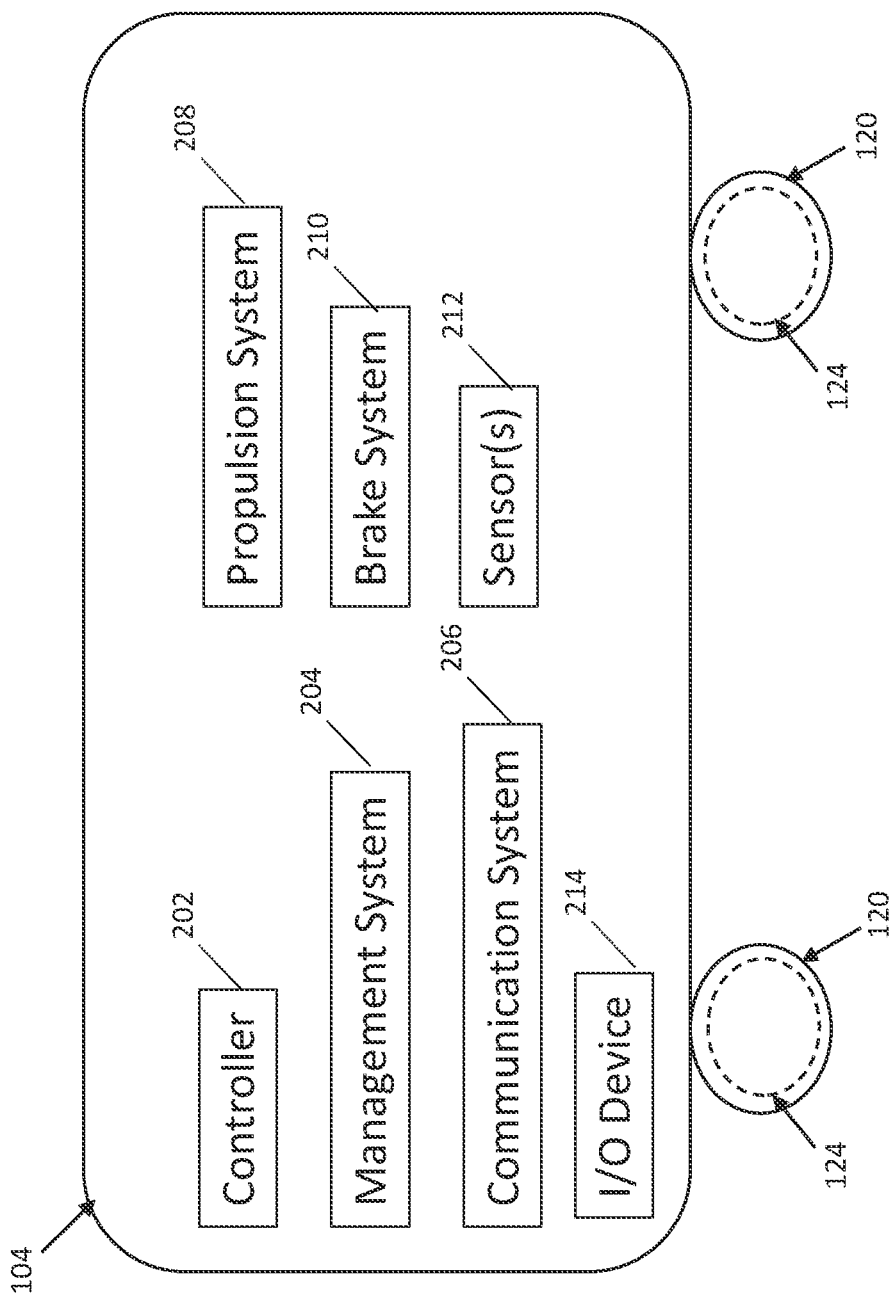
FIG. 2 illustrates a vehicle of the vehicle control system shown in FIG. 1.

FIG. 2 illustrates a schematic of one of the first vehicles 104 shown in FIG. 1. The vehicle may be a propulsion-generating vehicle, and may include a controller 202 that represents hardware circuitry connected with and/or including one or more processors that perform the operations described herein in connection with the vehicle control system. The processors may include microprocessors, microcontrollers, integrated circuits, field programmable gate arrays, or other logic devices that operate based on instructions stored on a tangible and non-transitory computer readable storage medium, such as software applications stored on a memory or database. In one embodiment, the controller can represent a vehicle controller or vehicle control unit. The controller may include a single processor or multiple processors. All operations can be performed by each processor, or each processor may perform at least one different operation than one or more (or all) other processors). The processors may be in the same or different locations (such as by being disposed within or part of different devices). The applications described herein may direct operation of the first vehicle, the vehicle system, and/or other devices.

Another device of the first vehicle may be one or more sensors 212 that sense characteristics of the first vehicle, the second vehicle, the multi-vehicle system, other devices, the environment around the vehicle system, etc.

The first vehicle may include a brake system 210. The brake system can represent one or more of friction brakes, air brakes, dynamic brakes (e.g., one or more of the traction motors of the propulsion system that also can generate braking effort via dynamic braking), or the like. In one or more embodiments, energy generated by the brake system via dynamic braking may be directed to the energy storage device where the energy may be stored for use within other systems of the vehicle system, or may be directed to a resistor grid (such as if the battery is at full capacity or the electrical generation is at a c-rate higher than desirable for a battery). The first vehicle may include an input/output device 214 ("I/O Device" in FIG. 2), such as a touchscreen, keyboard, electronic mouse, electronic display other than a touchscreen, switch, lever, button, speaker, microphone, etc., used to present information to and/or receive information from operators of the powered system.

The first vehicle may include a propulsion system 208 that can represent one or more components that are powered to propel the powered system or vehicle system, such as motors. Optionally, the propulsion system can include an engine and/or alternator or generator that operates to separately provide electric energy to power loads of the powered system (e.g., the motors). In one or more embodiments, the propulsion system may be operably coupled with one or more energy storage devices (not shown) that may provide power to one or more components of the propulsion system. Optionally, the propulsion system may generate power that may be directed to and stored within the one or more energy storage devices. Suitable energy storage devices may store energy that may be used to power auxiliary and/or non-auxiliary loads of the vehicle system. In one or more embodiments, the auxiliary loads can be powered by the energy storage devices and/or the propulsion system to perform work that does not propel the vehicle system. For example, the auxiliary loads can include display devices, monitoring devices (e.g., sensors), or the like.

In one or more embodiments, the first vehicle and/or the vehicle system may be powered by one or more different fuel and/or energy types. With respect to the fuel, the fuel may be a single fuel type in one embodiment and in other embodiments the fuel may be a mixture of a plurality of different fuels. In one example of a fuel mixture, a first fuel may be liquid and a second fuel may be gaseous. A suitable liquid fuel may be diesel (regular, biodiesel, HDRD, and the like), gasoline, kerosene, dimethyl ether (DME), alcohol, and the like. A suitable gaseous fuel may be natural gas (methane) or a short chain hydrocarbon, hydrogen, ammonia, and the like. In one embodiment, fuel may be inclusive of stored energy as used herein. In that perspective, a battery state of charge, or a source of compressed gas, a flywheel, fuel cell, and other types of non-traditional fuel sources may be included. Optionally, the first vehicle, the second vehicle, and/or vehicle system may be powered by electric energy (e.g., direct and/or alternating current). One or more energy sources may provide the electric energy to one or more loads, and the energy sources may include one or more fuel cells.

The first vehicle may include a management system 204 that represents hardware circuitry including and/or connected with one or more processors that calculate and/or dictate operational settings of the vehicle system. This circuitry and/or the processors may be the same as or separate from (e.g., in addition to) the circuitry and/or processors of the controller. The management system may calculate settings to achieve one or more goals of the vehicle system subject to various constraints. As one example, the management system can determine a trip plan that dictates operational settings of the vehicle system at different locations, different times, different distances, etc., of upcoming travel of the vehicle system. These operational settings can cause the vehicle system to travel within the constraints (e.g., speed limits, forces exerted on the vehicle and/or the route, remaining a safe distance from other vehicles or objects, or the like) while driving the vehicle system toward achievement of the goal(s) (e.g., reducing fuel consumption, battery energy consumption, emission generation, reduce audible noise, etc.) relative to the vehicle system traveling within the constraints but using other settings. The operational settings can be throttle settings, brake settings, speeds, or the like.

In one or more embodiments, the management system may determine the trip plan and the corresponding operational settings of the vehicle system based on one or more of: the type of route equipment that is disposed onboard the first vehicle, the one or more different classifications of pathways along a route (e.g., based on one or more gauges of a track at one or more locations along the route), the type of route equipment that is disposed on one or more other vehicles of the multi-vehicle system, or the like. For example, the trip plan may be determined based in part on the type of route equipment onboard a vehicle, and which gauges of tracks the route equipment is compatible with or on which gauge of track the vehicle can operate.

The devices of the first vehicle may be communicatively coupled with each other by a communication system 206. The communication system can be formed from communication pathways provided by or extending in conductive pathways (e.g., cables, buses, etc., such as Ethernet cables or connections) and/or wireless pathways. Some devices may be publisher devices or publishers that generate output. Some devices may be listener devices or listeners that obtain or receive the output from the publishers to perform some operation (e.g., control of the powered system, calculation of output, etc.). Some devices may be both publishers and listeners that receive data from another device, make a calculation, determination, etc. based on the received data, and generate data as an output for another device and/or perform some action (e.g., change operation of the powered system, such as changing a speed, throttle setting, etc., of a vehicle).

In one or more embodiments, the first vehicle may include a memory or alternative data storage system (not shown). For example, a memory can store information about the first vehicle, about different vehicles of the multi-vehicle system, the route, historical trip information (e.g., information associated with how the vehicle system was automatically and/or manually controlled during previous trips along the route), historical trip information of other vehicle systems (e.g., information associated with how another vehicle system automatically and/or manually controlled during previous trips along the same route and/or along different routes), or the like. In one or more embodiments, the memory can store information about the type of route along which the first vehicle has moved (e.g., during past or previous trips), one or more operating settings of the first vehicle as the vehicle moves along the first type of route, locations of plural different classifications of pathways along the route (e.g., based on a gauge of a track at locations along the route), locations where the type of route or a classification of the route changes (e.g., at switches or the like), or the like. Optionally, the first vehicle may receive data stored in a data storage device or memory of the off-board control system (not shown), data stored in another storage system (e.g., a cloud storage database and/or other virtual storage systems), or the like.

Figure 3:
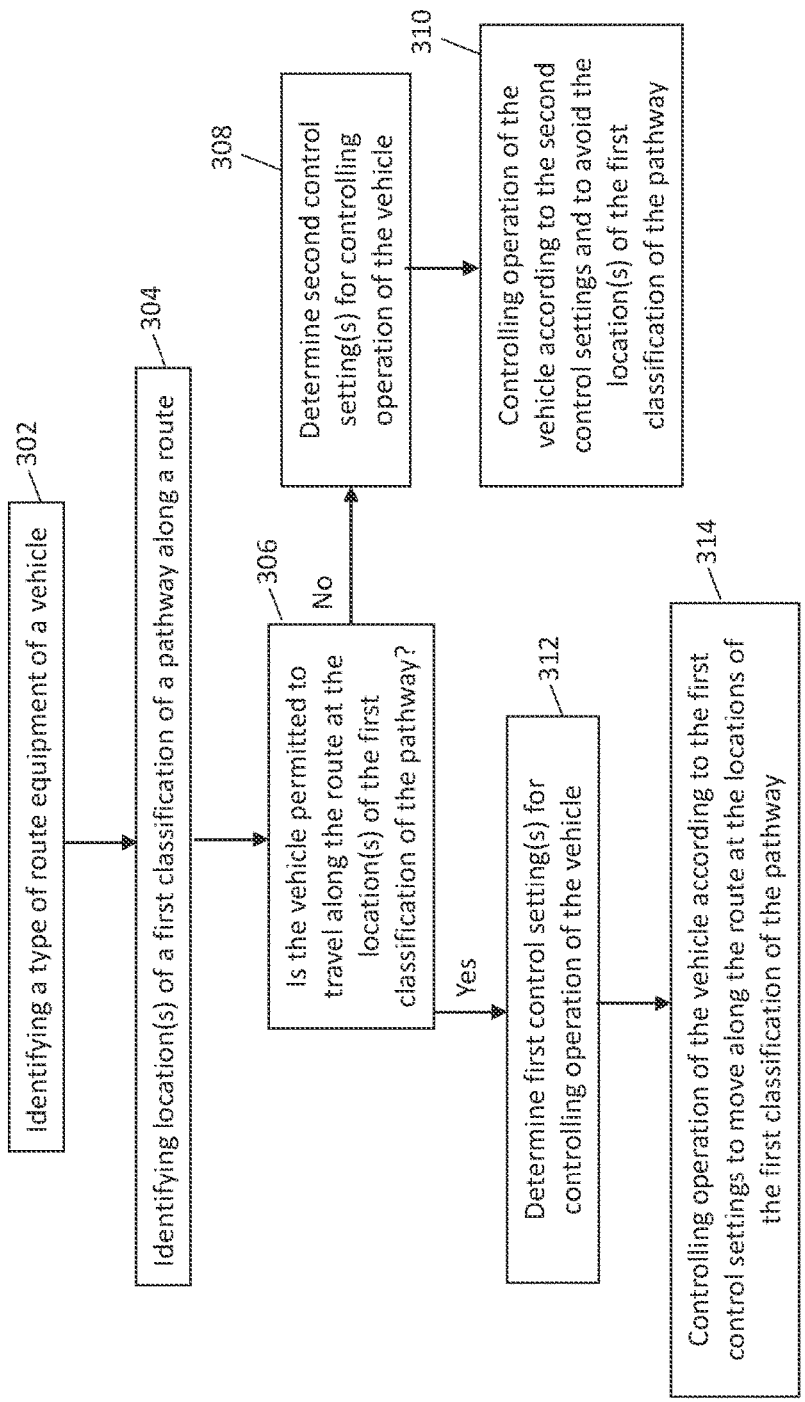
FIG. 3 illustrates a flowchart of one example of a method for controlling operation of a vehicle system, in accordance with one embodiment.

FIG. 3 illustrates a flowchart 300 of one example of a method for controlling operation of a vehicle system, in accordance with one embodiment. At step 302, a type of route equipment that is disposed on a vehicle is identified. The type of route equipment may dictate what routes the vehicle is allowed or permitted to travel, what routes the vehicle must avoid, control settings for operating the vehicle, or the like. In one or more embodiments, the vehicle may be a single vehicle that a single or first type of route equipment. Optionally, the vehicle may include two or more different types of route equipment. Optionally, the vehicle may be included in a multi-vehicle system, and a determination may need to be made as to the different types of route equipment that are disposed on each of the different vehicles of the multi-vehicle system.

At step 304, one or more locations of a first classification of a pathway from among plural different classifications of pathways along a route may be identified. For example, a route (e.g., between a first location and a second location) may be setup and/or may include one or more different classifications of pathways. Each of the different classifications of pathways may be associated with different gauges of a track, different types of routes (e.g., tracks, paved roads, electric rails, waterways, or the like).

Figure 4:
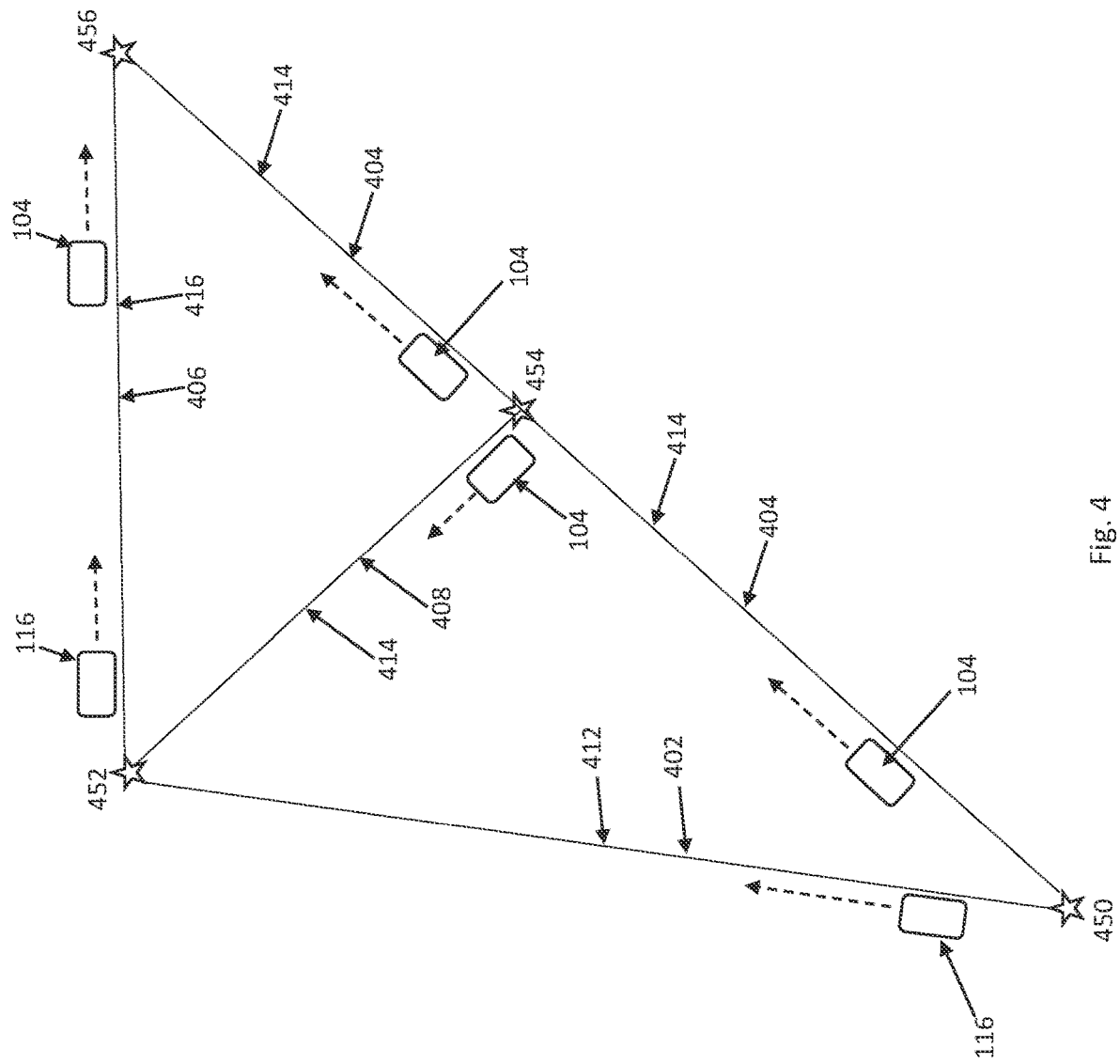
FIG. 4 illustrates a schematic of intersecting routes, in accordance with one embodiment.

FIG. 4 illustrates a schematic of intersecting routes, in accordance with one embodiment. The schematic includes a first location 450, a second location 452, a third location 454, and a fourth location 456. A first route 402 that extends between the first and second locations 450, 452 may have a first classification 412. A second route 404 that extends between the first, third, and fourth locations 450, 454, 456 may have a second classification 414. A third route 406 that extends between the second and fourth locations 452, 456 may have a third classification 416. A fourth route 408 that extends between the second and third locations 452, 454 may have the same second classification 414 as the second route 404. The schematic illustrated in FIG. 4 is for illustrative purposes only, and may have any alternative arrangement of routes, routes having different classifications, or any combination therein.

Returning to FIG. 3, at step 306, a determination is made if the vehicle is allowed or permitted to travel along the route at the locations having the first classification of the pathway of the plural different classifications of pathways. In the illustrated embodiment of FIG. 4, the first vehicle 104 (e.g., that includes the first type of route equipment 124) may be permitted or allowed to move along the routes at locations that have the second classification 414, the third classification 416, and the fourth classification 418. Additionally, the second vehicle 116 (e.g., that includes the second type of route equipment 134) may be permitted or allowed to move along the routes at locations that have the first classification 412 and the third classification 416, but may be prohibited from moving along the routes that have the second classification 414. For example, in order for the second vehicle to move from the first location 450 to the fourth location 456, the second vehicle must move along the first route 402 from the first location 450 to the second location 452, and along the third route 406 from the second location 452 to the fourth location 456. For example, the second vehicle may need to travel a longer distance between the first and fourth locations 450, 456 based on the second vehicle not having the type of route equipment that is compatible with the locations of the routes that have the second classification 414.

In one or more embodiments, the second vehicle may be mechanically coupled with the first vehicle in a multi-vehicle system (as shown in FIG. 1). The first vehicle may include the first type of route equipment that is compatible with pathways having the first and second classifications 412, 414; the second vehicle may include the second type of route equipment that is compatible with the route having only the first classification 412 but may be incompatible with the route having the second classification 414. The trip plan for the multi-vehicle system may be determined based on the second vehicle that has route equipment that is incompatible with the route having the second classification 414. For example, although the first vehicle is allowed to move along the second route 404 that has the second classification 414, the second vehicle is prohibited from moving along the second route that has the second classification 414, and therefore the multi-vehicle system may be required to travel a longer distance between the first and fourth locations based on the second vehicle not having the type of route equipment that is compatible with the locations of the route that have the second classification. For example, the trip plan that may be determined for the multi-vehicle may be governed by the type of route equipment of the second vehicle.

Returning to FIG. 3, if the vehicle is permitted to travel along the route at the location having the first classification of pathway, flow of the method proceeds toward step 312. Alternatively, if the vehicle is not permitted to travel along the route at the location having the first classification of pathway, flow of the method proceeds toward step 308. For example, the first vehicle may be allowed or permitted to travel along the second route having the second classification 414, and therefore flow of the method associated with the first vehicle may proceed toward step 312. Alternatively, the second vehicle may be prohibited from traveling along the second route having the second classification 414, and therefore flow of the method associated with the second vehicle may proceed toward step 308.

At steps 308 and 312, one or more control settings for controlling operation of the vehicle are determined. For example, at step 312, one or more first control settings may be determined based on the vehicle (e.g., that includes the first type of route equipment) to move at locations having the first classification. Alternatively, at step 308, one or more second control settings may be determined based on the vehicle (e.g., that includes a second type of route equipment) to move at locations along the route other than the first classification (e.g., to avoid locations having the first classification). The control settings may include one or more brake settings, one or more throttle or speed settings (e.g., of the propulsion system), or the like.

In one or more embodiments, the trip plan including one or more speed settings and/or brake settings may be determined for the multi-vehicle system that includes the first vehicle and the second vehicle. For example, the first and second vehicles may include route equipment that is compatible to move along the second route 404 that has the second classification 414 of pathway, but the first type of route equipment onboard the first vehicle may require that the first vehicle travels at a first speed threshold, and the second type of route equipment onboard the second vehicle may require that the second vehicle travels at a second speed threshold. A comparison between the first and second speed thresholds may be conducted and/or made to determine which of the first or second speed thresholds is less than the other of the first or second speed thresholds. For example, if the first speed threshold is less than (e.g., slower) the second speed threshold, then the trip plan may include control settings for controlling operation of the multi-vehicle system to operate according to at least the first speed threshold. Alternatively, if the second speed threshold is less than (e.g., slower) the first speed threshold, then the trip plan may include control settings for controlling operation of the multi-vehicle system to operate according to at least the second speed threshold.

At step 314, operation of the vehicle may be controlled according to the determined first control settings to move the vehicle along the route at locations of the first classification of the pathway. For example, the first vehicle may be allowed to move along the second route 404 that has the second classification 414 based in part on the first type of route equipment 124 that is disposed onboard the first vehicle and the second classification of the pathway. The one or more first control settings may be determined based on the first type of route equipment 124, the second classification of the pathway 414, or the like.

Alternatively, at step 310, operation of the vehicle may be controlled according to the determined second control settings to move along the route and to avoid the locations of the first classification of the pathway. For example, the second vehicle may be allowed to move along the first route 402 that has the first classification 412 but may be prohibited from moving along the second route 404 that has the second classification 414 based on the second type of route equipment 134 that is disposed onboard the second vehicle. The one or more second control settings may be determined based on the second type of route equipment 134, the first classification of the pathway 412, or the like, to move the second vehicle along the route and avoid locations of the route having the second classification 414 of the pathway.

In one or more embodiments, historical route data, such as route data stored in a memory of one of the vehicles (not shown), a memory of the off-board control system (not shown), or a data storage cloud space may be updated and/or modified. For example, the historical route data may indicate locations of the plural different classifications of the pathways, but the classification of the pathway at one or more locations may have changed. The historical route data may be modified such as to override the historical route data that is outdated with updated route data that correctly identifies the correct classification of the pathways at the locations along the route. Optionally, data associated with the one or more first or second control settings for controlling operation of the vehicle(s), the make-up of the multi-vehicle systems, and/or the types of route equipment disposed onboard the vehicle(s) may be added to and/or updated in a memory or other data storage device.

In one or more embodiments, the second vehicle may be permitted to move along the second route 404 that has the second classification 414 of the pathway, but the control settings for controlling operation of the second vehicle to move along the second route may be different than the control settings for controlling operation of the second vehicle to move along the first route 402. For example, the second type of route equipment 134 may be compatible with the first classification 412 and the second classification 414 of the pathway, but the second vehicle may need to operate at a reduced speed while moving along the route at locations having the second classification relative to a speed at which the second vehicle is allowed to move at locations having the first classification. For example, the second vehicle may be permitted to move along the route at locations having the first and second classifications, but one or more control settings for controlling operation of the second vehicle at the different locations of the different classifications may need to change based on the type of route equipment that is disposed onboard the second vehicle.

In one or more embodiments, the controller 202 of the first vehicle 104 (or another controller onboard the multi-vehicle system 102) may receive one or more command messages, such as from the off-board control system 106. The command messages may be referred to as bulletins, reports, updates, or the like. The command messages may be directed to a specific vehicle system, such as based on the type(s) of route equipment that is disposed onboard the vehicle system, based on the one or more different classifications of pathways the vehicle system is expected to travel, or the like. Optionally, the command messages may be communicated to one or more vehicle systems moving within a determined geographic region or area, moving along one or more particular routes, based on the type of cargo the vehicle system is carrying, or any combination therein.

The command messages may include one or more control settings that dictate how the first vehicle, the second vehicle, and/or the multi-vehicle system are to operate, locations that the first vehicle, second, vehicle, and/or multi-vehicle system are allowed to travel, locations that the first vehicle, second vehicle, and/or multi-vehicle system are to avoid (e.g., are prohibited from traveling), or the like. In one or more embodiments, the control settings of the command message(s) may include one or more speed restrictions for operating the vehicle(s) at one or more locations along the route. For example, one or more throttle settings and/or brake settings the vehicle(s) may be controlled based at least in part on the command messages. In one embodiment, the vehicle(s) may be automatically (e.g., without operator intervention) controlled according to the control settings of the command messages (e.g., the throttle and/or brake settings at one or more different locations along the route) or the command messages may be instructions to an operator to manually control operation of the vehicle(s) according to the control settings at the different locations along the route. Optionally, the command messages may be received from an operator onboard the vehicle(s) and/or from the off-board controller (e.g., automatically from the off-board control system of the off-board controller or from an operator controlling operation of the off-board controller).

In one or more embodiments, the onboard controller 202 and/or the off-board control system 106 may determine which vehicle(s) and/or how many vehicles having different types of route equipment to include in the multi-vehicle system, such as based on one or more routes having different classifications of pathways that the multi-vehicle system is expected to traverse, based on a timeline of travel that the vehicle system is expected to meet (e.g., to reach a destination location within a determined time limit), or the like. The onboard controller and/or the off-board control system may identify one or more vehicles to include in the multi-vehicle system, and/or may identify one or more vehicles that may not be included in the multi-vehicle system based at least in part on the types of route equipment disposed on the different vehicles.

In one embodiment, the controller and/or the off-board control system may have a local data collection system deployed that may use machine learning to enable derivation-based learning outcomes. The controller may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and behavior analytics, and the like.

In one embodiment, the controller and/or control system may include a policy engine that may apply one or more policies. These policies may be based at least in part on characteristics of a given item of equipment or environment. With respect to control policies, a neural network can receive input of a number of environmental and task-related parameters. These parameters may include an identification of a determined trip plan for a vehicle group, data from various sensors, and location and/or position data. The neural network can be trained to generate an output based on these inputs, with the output representing an action or sequence of actions that the vehicle group should take to accomplish the trip plan. During operation of one embodiment, a determination can occur by processing the inputs through the parameters of the neural network to generate a value at the output node designating that action as the desired action. This action may translate into a signal that causes the vehicle to operate. This may be accomplished via backpropagation, feed forward processes, closed loop feedback, or open loop feedback. Alternatively, rather than using backpropagation, the machine learning system of the control system may use evolution strategies techniques to tune various parameters of the artificial neural network. The control system may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle control system executes that plan to achieve the desired input data to mirror the predicted best outcome scenario. Additionally, the success metric may be a combination of the optimized outcomes, which may be weighed relative to each other.

The control system can use this artificial intelligence or machine learning to receive input (e.g., a location or change in location), use a model that associates locations with different operating modes to select an operating mode of the one or more functional devices of the first vehicle, the second vehicle, and/or the multi-vehicle system, and then provide an output (e.g., the operating mode selected using the model). The control system may receive additional input of the change in operating mode that was selected, such as analysis of noise or interference in communication signals (or a lack thereof), operator input, or the like, that indicates whether the machine-selected operating mode provided a desirable outcome or not. Based on this additional input, the control system can change the model, such as by changing which operating mode would be selected when a similar or identical location or change in location is received the next time or iteration. The control system can then use the changed or updated model again to select an operating mode, receive feedback on the selected operating mode, change or update the model again, etc., in additional iterations to repeatedly improve or change the model using artificial intelligence or machine learning.

In accordance with one example or aspect, a method may include identifying a type of route equipment disposed onboard a vehicle, and identifying one or more locations of a first classification of a pathway from among plural different classifications of pathways along a route. One or more first control settings for controlling operating of the vehicle at the one or more locations of the first classification of the pathway may be determined based at least in part on the type of route equipment that is disposed onboard the vehicle and the first classification of the pathway. Operation of the vehicle may be controlled according to the one or more first control settings to move the vehicle along the route at the one or more locations of the first classification of the pathway.

Optionally, the method may include modifying historical route data to indicate one or more locations of the plural classifications of the pathways along the route. Optionally, the plural different classifications of the pathways may be based on one or more gauges of a track at one or more locations along the route.

Optionally, the method may include receiving one or more command messages one or more of prior to the vehicle moving along the route or during transit of the vehicle moving along the route. The one or more command messages may include the one or more first control settings for operating the vehicle to move along the route. Optionally, the one or more command messages may include one or more speed restrictions for operating the vehicle at one or more locations along the route. Optionally, one or more throttle settings or brake settings of the vehicle may be controlled based at least in part on the one or more command messages. Optionally, the one or more command messages may be received from one or more of an operator onboard the vehicle or an off-board controller.

Optionally, a determination may be made that the vehicle can be included in a multi-vehicle system that may move along the route based at least in part on the type of route equipment that is disposed onboard the vehicle. Optionally, one or more locations of a second classification of a pathway may be identified from among the plural different classifications of the pathways along the route. Optionally, a determination may be made that the vehicle is prohibited from moving along the route at the one or more locations of the second classification of the pathway based at least in part on the type of route equipment that is disposed onboard the vehicle and the second classification of the pathway. Operation of the vehicle may be controlled to move along the route at the one or more locations of the first classification of the pathway and to avoid the route at the one or more locations of the second classification of the pathway. Optionally, a determination may be made that the vehicle is permitted to move along the route at the one or more locations of the second classification of the pathway based at least in part on the type of route equipment that is disposed onboard the vehicle and the second classification of the pathway. One or more second control settings for controlling operation of the vehicle to move along the route at the one or more locations of the second classification of the pathway may be determined based at least in part on the type of route equipment that is disposed onboard the vehicle and the second classification of the pathway.

In accordance with another example or aspect, a system may include a controller having one or more processors configured to identify a type of route equipment that is disposed onboard a vehicle. The controller can identify one or more locations of a first classification of a pathway from among plural different classifications of pathways along a route. The controller can determine one or more first control settings for controlling operation of the vehicle at the one or more locations of the first classification of the pathway based at least in part on the type of route equipment that is disposed onboard the vehicle and the first classification of the pathway. The controller can control operation of the vehicle according to the one or more first control settings to move the vehicle along the route at the one or more locations of the first classification of the pathway.

The processors may modify historical route data to indicate one or more locations of the plural different classifications of the pathways along the route. Optionally, the plural different classifications of the pathways may be based on one or more gauges of a track at one or more locations along the route. Optionally, the processors may receive one or more command messages one or more of prior to the vehicle moving along the route or during transit of the vehicle moving along the route. The one or more command messages may include the one or more first control settings for controlling operation of the vehicle to move along the route. Optionally, the command messages may include one or more speed restrictions for controlling operation of the vehicle at one or more locations along the route. Optionally, the processors may identify one or more locations of a second classification of a pathway from among the plural different classifications of the pathways along the route. Optionally, the processors may determine that the vehicle is prohibited from moving along the route at the one or more locations of the second classification of the pathway based at least in part on the type of route equipment that is disposed onboard the vehicle and the second classification of the pathway. The processors may control operation of the vehicle to move along the route at the one or more locations of the first classification of the pathway and to avoid the route at the one or more locations of the second classification of the pathway. Optionally, the processors may determine that the vehicle is permitted to move along the route at the one or more locations of the second classification of the pathway based at least in part on the type of route equipment that is disposed onboard the vehicle and the second classification of the pathway. The processors may determine one or more second control settings for controlling operation of the vehicle to move along the route at the one or more locations of the second classification of the pathway based at least in part on the type of route equipment that is disposed onboard the vehicle.

In accordance with another example or aspect, a method may include identifying a first type of route equipment that is disposed onboard a first vehicle of a multi-vehicle system, and identifying a second type of route equipment that is disposed onboard a second vehicle of the multi-vehicle system. A first speed threshold for controlling operation of the first vehicle at one or more locations of a first classification of a pathway may be determined based at least in part on the first type of route equipment that is disposed onboard the first vehicle. The first classification of the pathway is based on a gauge of track at the one or more locations of the first classification of the pathway along a route. A second speed threshold for controlling operation of the second vehicle at the one or more locations of the first classification of the pathway may be determined based at least in part on the second type of route equipment that is disposed onboard the second vehicle. A determination may be made that the first speed threshold is less than the second speed threshold based on a comparison between the first and second speed thresholds. Operation of the multi-vehicle system may be controlled according to the first speed threshold to move along the route at the one or more locations of the first classification of the pathway responsive to determining that the first speed threshold is less than the second speed threshold.

Use of phrases such as "one or more of . . . and," "one or more of . . . or," "at least one of . . . and," and "at least one of . . . or" are meant to encompass including only a single one of the items used in connection with the phrase, at least one of each one of the items used in connection with the phrase, or multiple ones of any or each of the items used in connection with the phrase. For example, "one or more of A, B, and C," "one or more of A, B, or C," "at least one of A, B, and C," and "at least one of A, B, or C" each can mean (1) at least one A, (2) at least one B, (3) at least one C, (4) at least one A and at least one B, (5) at least one A, at least one B, and at least one C, (6) at least one B and at least one C, or (7) at least one A and at least one C.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in another device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

As used herein, an element or step recited in the singular and preceded with the word "a" or "an" do not exclude the plural of said elements or operations, unless such exclusion is explicitly stated. Furthermore, references to "one embodiment" of the invention do not exclude the existence of additional embodiments that incorporate the recited features. Moreover, unless explicitly stated to the contrary, embodiments "comprising," "comprises," "including," "includes," "having," or "has" an element or a plurality of elements having a particular property may include additional such elements not having that property. In the appended claims, the terms "including" and "in which" are used as the plain-English equivalents of the respective terms "comprising" and "wherein." Moreover, in the following claims, the terms "first," "second," and "third," etc. are used merely as labels, and do not impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function devoid of further structure.

This written description uses examples to disclose several embodiments of the subject matter, including the best mode, and to enable one of ordinary skill in the art to practice the embodiments of subject matter, including making and using any devices or systems and performing any incorporated methods. The patentable scope of the subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A method, comprising:
identifying a type of route equipment disposed onboard a vehicle;
identifying one or more locations of a first classification of a pathway from among plural different classifications of pathways along a route;
determining one or more first control settings for controlling operation the vehicle at the one or more locations of the first classification of the pathway based at least in part on the type of route equipment disposed onboard the vehicle and the first classification of the pathway; and
controlling operation of the vehicle according to the one or more first control settings to move the vehicle along the route at the one or more locations of the first classification of the pathway.

2. The method of claim 1, further comprising modifying historical route data to indicate one or more locations of the plural different classifications of the pathways along the route.

3. The method of claim 1, wherein the plural different classifications of the pathways are based on one or more gauges of a track at one or more locations along the route.

4. The method of claim 1, further comprising receiving one or more command messages one or more of prior to the vehicle moving along the route or during transit of the vehicle moving along the route, the one or more command messages including the one or more first control settings for operating the vehicle to move along the route.

5. The method of claim 4, wherein the one or more command messages include one or more speed restrictions for operating the vehicle at one or more locations along the route.

6. The method of claim 4, further comprising controlling one or more throttle settings or brake settings of the vehicle based at least in part on the one or more command messages.

7. The method of claim 4, further comprising receiving the one or more command messages from one or more of an operator onboard the vehicle or an off-board controller.

8. The method of claim 1, further comprising determining that the vehicle can be included in a multi-vehicle system configured to move along the route based at least in part on the type of route equipment disposed onboard the vehicle.

9. The method of claim 1, further comprising identifying one or more locations of a second classification of the pathway from among the plural different classifications of the pathways along the route.

10. The method of claim 9, further comprising:
determining that the vehicle is prohibited from moving along the route at the one or more locations of the second classification of the pathway based at least in part on the type of route equipment disposed onboard the vehicle and the second classification of the pathway; and
controlling operation of the vehicle to move along the route at the one or more locations of the first classification of the pathway and to avoid the route at the one or more locations of the second classification of the pathway.

11. The method of claim 9, further comprising:
determining that the vehicle is permitted to move along the route at the one or more locations of the second classification of the pathway based at least in part on the type of route equipment disposed onboard the vehicle and the second classification of the pathway; and
determining one or more second control settings for controlling operation of the vehicle to move along the route at the one or more locations of the second classification of the pathway based at least in part on the type of route equipment disposed onboard the vehicle and the second classification of the pathway.

12. A system, comprising:
a controller including one or more processors configured to identify a type of route equipment disposed onboard a vehicle,
the controller configured to identify one or more locations of a first classification of a pathway from among plural different classifications of pathways along a route,
the controller configured to determine one or more first control settings for controlling operation of the vehicle at the one or more locations of the first classification of the pathway based at least in part on the type of route equipment disposed onboard the vehicle and the first classification of the pathway, and
the controller configured to control operation of the vehicle according to the one or more first control settings to move the vehicle along the route at the one or more locations of the first classification of the pathway.

13. The system of claim 12, wherein the controller is configured to modify historical route data to indicate one or more locations of the plural different classifications of the pathways along the route.

14. The system of claim 12, wherein the plural different classifications of the pathways are based on one or more gauges of a track at one or more locations along the route.

15. The system of claim 12, wherein the controller is configured to receive one or more command messages one or more of prior to the vehicle moving along the route or during transit of the vehicle moving along the route, the one or more command messages including the one or more first control settings for controlling operation of the vehicle to move along the route.

16. The system of claim 15, wherein the one or more command messages include one or more speed restrictions for controlling operation of the vehicle at one or more locations along the route.

17. The system of claim 12, wherein the controller is configured to identify one or more locations of a second classification of the pathway from among the plural different classifications of the pathways along the route.

18. The system of claim 17, wherein the controller is configured to determine that the vehicle is prohibited from moving along the route at the one or more locations of the second classification of the pathway based at least in part on the type of route equipment disposed onboard the vehicle and the second classification of the pathway, the controller configured to control operation of the vehicle to move along the route at the one or more locations of the first classification of the pathway and to avoid the route at the one or more locations of the second classification of the pathway.

19. The system of claim 17, wherein the controller is configured to determine that the vehicle is permitted to move along the route at the one or more locations of the second classification of the pathway based at least in part on the type of route equipment disposed onboard the vehicle and the second classification of the pathway, and
the controller configured to determine one or more second control settings for controlling operation of the vehicle to move along the route at the one or more locations of the second classification of the pathway based at least in part on the type of route equipment disposed onboard the vehicle.

20. A method, comprising:
identifying a first type of route equipment disposed onboard a first vehicle of a multi-vehicle system;
identifying a second type of route equipment disposed onboard a second vehicle of the multi-vehicle system;
determining a first speed threshold for controlling operation of the first vehicle at one or more locations of a first classification of a pathway based at least in part on the first type of route equipment disposed onboard the first vehicle, the first classification of the pathway based on a gauge of a track at the one or more locations of the first classification of the pathway along a route;
determining a second speed threshold for controlling operation of the second vehicle at the one or more locations of the first classification of the pathway based at least in part on the second type of route equipment disposed onboard the second vehicle;

determining that the first speed threshold is less than the second speed threshold based on a comparison between the first speed threshold and the second speed threshold; and controlling operation of the multi-vehicle system according to the first speed threshold to move along the route at the one or more locations of the first classification of the pathway responsive to determining that the first speed threshold is less than the second speed threshold.

* * * * *